Figure 1:
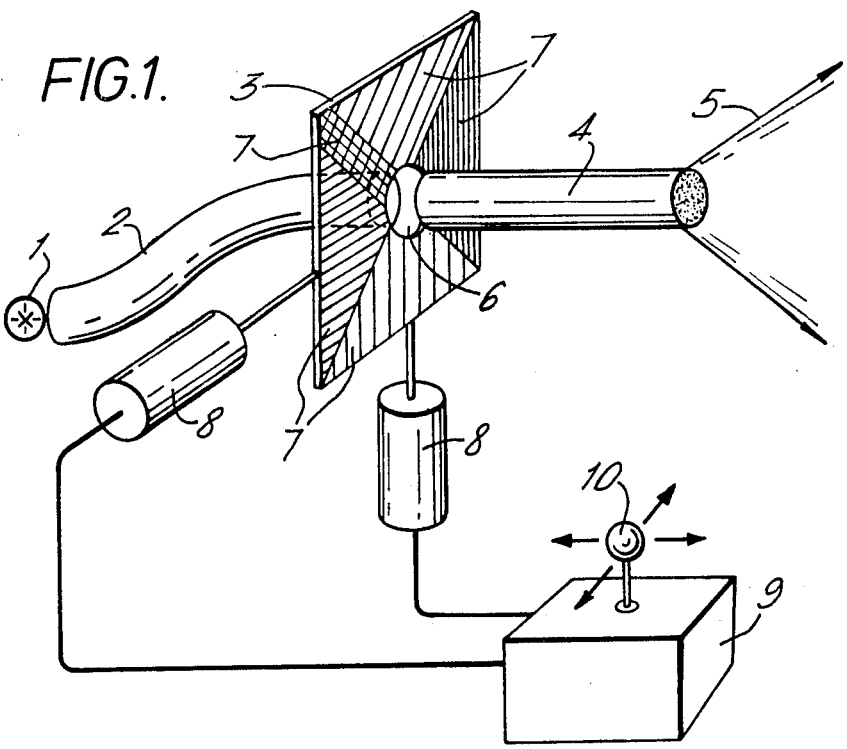

United States

Bentley

[11] 3,912,361

[45] Oct. 14, 1975

[54] VARIABLE COLOUR LIGHT BEAM PRODUCING DEVICE

[75] Inventor: John McDonald Bentley, Loughborough, England

[73] Assignee: The Rank Organisation Limited, London, England

[22] Filed: Feb. 22, 1974

[21] Appl. No.: 445,302

[30] Foreign Application Priority Data
Feb. 22, 1973 United Kingdom............... 8624/73

[52] U.S. Cl................ 350/96 B; 350/315; 350/317
[51] Int. Cl.²..................... G02B 5/16; G02B 5/22
[58] Field of Search.......... 350/313, 315, 317, 96 B; 356/189

[56] References Cited
UNITED STATES PATENTS

| | | | |
|---|---|---|---|
| 1,971,737 | 8/1934 | Troland | 356/189 |
| 3,217,594 | 11/1965 | Simmon | 350/96 B |
| 3,227,044 | 1/1966 | Hunt et al. | 350/315 |

*Primary Examiner*—Ronald J. Stern
*Attorney, Agent, or Firm*—Brisebois & Kruger

[57] ABSTRACT

Light of a selectively controlled colour composition is produced by passing a beam through a filter having differently coloured areas which is movable selectively under manual control relative to the beam, to vary the relative proportion of colour components in the beam, the resulting beam being integrated for example in a fibre optic integrating light guide, to form uniformly coloured emergent light.

4 Claims, 2 Drawing Figures

U.S. Patent  Oct. 14, 1975  3,912,361

3,912,361

VARIABLE COLOUR LIGHT BEAM PRODUCING DEVICE

This invention relates to variable colour light beam producing devices, and is particularly, but not exclusively, applicable to multiple beam projectors.

According to the invention there is provided a device for producing a light beam of variable colour, comprising means for directing a beam of light through part only of a composite filter having a number of areas of different colour, control means for varying selectively the relative position of the beam and the filter so that the part of the filter through which the beam passes comprises one side area only, or variable proportions of adjacent said areas, to vary the colour composition of the beam transmitted by the filter, and means for integrating the light beam after its passage through the filter.

The control means, which is preferably manually operable, enables the proportion of different colours in the light beam transmitted by the filter to be varied at will, so that both the depth and hue of the colour of the emergent light beam can be varied smoothly as desired. The control means are preferably effective to displace the filter in a plane normal to the light beam, the filter being conveniently in the form of a flat plate or sheet.

The device is preferably arranged so that in one setting of the control means, conveniently a rest or "neutral" setting, the colour of the beam passing through the filter, which will usually comprise white light, is unchanged. Thus in a preferred embodiment of the invention the filter has a central transparent area and a number of peripheral areas of different colour adjacent said central area, the beam passing solely through the central area in one setting of the control means. The central area may comprise a region of clear glass or plastics, or may alternatively comprise an aperture in the filter. Preferably the said central area is circular, the beam having a circular cross-section substantially equal to that of the central area.

The filter may comprise a square plate subdivided into areas of different colour with linear boundaries between said areas extending substantially radially from the centre of the plate.

The control means may be of any suitable form, but in a preferred embodiment of the invention the control means has a universally movable manual member in the form of a joy-stick operatively associated with a suitable servo-mechanism so that movement of the member from a central "neutral" rest position in any selected direction causes displacement in a corresponding direction of the filter relative to the light beam, by an amount proportional to the displacement of the control member from its neutral position. Thus where the filter has a central transparent area, and the control member is moved progressively in a radial direction from its central position, the beam will pass through a progressively increasing proportion of one or more of the peripheral coloured areas so that the emergent beam becomes coloured to a progressively increasing depth.

After passing through the filter the beam will generally be of non-uniform colour across its cross section, both in lateral position and in ray direction within the beam. The integrating means effects uniform mixing of the colour components of the beam, to form an output beam having a substantially homogeneous colour and preferably with a random distribution of light ray directions.

In a preferred embodiment of the invention use is made of a fibre optic light guide through which the beam passes after traversing the filter. The fibre optic light guide preferably comprises light conducting fibres the relative positions of which are interchanged randomly between the input and output ends of the guide. Preferably one or both ends of the fibre optic light guide are "greyed" — that is to say, the ends of the fibres are terminated randomly in different planes — so that the ray directions in the beam emerging from the light guide are randomly distributed, so that the beam produced by the device when projected onto a surface illuminates an area with light of a uniform colour.

Fibre optics are also preferably used for conducting light to the filter, and in a preferred embodiment of the invention the means for directing a beam of light through the filter comprises a fibre optic light guide extending from a light source to the filter.

The use of the fibre optic light guides extending to and from the filter facilitates the installation of the device according to the invention in a multiple beam optical projector, which in general would comprise a plurality of variable colour beam-producing devices as herein described, the control means of the individual devices having mutually juxtaposed manual control members, permitting selective control of the colour composition of all the beams.

Figure 2:
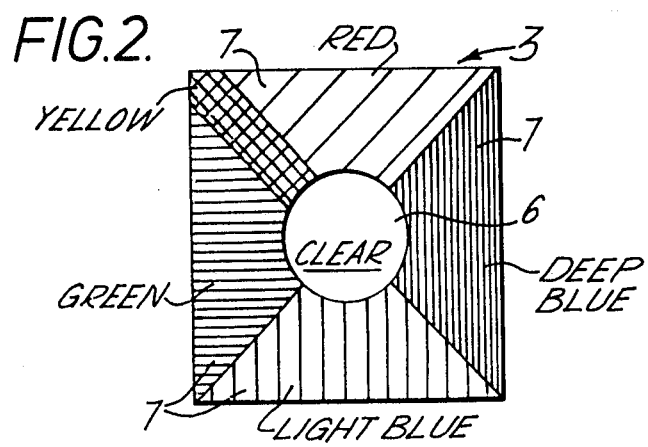

The invention will now be described, merely by way of example, with reference to the accompanying purely diagrammatic drawings, in which:

FIG. 1 is a schematic representation of variable colour beam producing device according to one embodiment of the invention, and FIG. 2 is a plan view of the filter used in the device of FIG. 1.

Referring to the drawings, FIG. 1 illustrates a device according to the invention for producing a light beam of variable colour. Light from a source 1 is directed through an input fibre-optic light guide 2 through a multi-coloured filter in the form of a flat glass plate 3 arranged with its plane perpendicular to the direction of the light beam emerging from the input light guide 2, the said light beam being circular in cross section. After passing through the filter 3 the light beam passes through an integrating fibreoptical light guide 4 the light-conducting fibres of which are randomly interchanged between the input and output ends of the light guide, so that the light beam 5 emerging from the integrating light guide 4 is of a uniform colour.

The filter plate 3 has a central circular transparent area 6 substantially equal in diameter to the circular-section light beam emergent from the input light guide 2, the area 6 being clear, and formed either by clear glass or by a circular aperture in the centre of the filter plate 3. The central clear area 6 is surrounded by a number of peripheral areas 7 of different colours with linear boundaries between adjacent areas 7 extending in a generally radial direction with respect to the centre of the filter plate 3, which is square in shape (FIG. 2).

The peripheral areas 7 of the filter plate 3 will in general comprise intensely coloured glass regions which transmit the different primary colours, according to the desired range of colours to be produced by the device, the colours in the example illustrated in FIG. 2 being indicated in the drawing. In some practical embodiments of the invention it may be convenient to provide additional peripheral areas of the filter plate 3 for transmitting colours other than the primary colours.

The filter plate 3 is mounted in a suitable arrangement illustrated diagrammatically, for controllably displacing the filter plate 3 in its own plane, that is, perpendicular to the direction of the light beam incident thereon from the input light guide 2, in any selected direction in said plane, by selectively variable amounts. As illustrated in FIG. 1 the filter is displaceably by respective actuators 8 arranged to displace the filter plate 3 in mutually perpendicular directions in its own plane, and controllable by a manual control unit 9 having a manually operable control lever 10 which is displaceable manually in any selected direction from the neutral position in which it is shown to effect a corresponding displacement of the filter plate 3. Thus the direction of movement of the control lever 10 determines the direction in which the filter plate 3 is moved, and the amount by which the lever 10 is displaced from its neutral position determines the magnitude of the displacement of the filter plate 3 in that direction.

When the universally movable control lever 10 is in its neutral rest position the filter plate 3 is disposed symmetrically with respect to the input light guide 2 so that the incident light beam emerging from the light guide 2 passes solely through the central clear area 6 of the filter plate 3. In this case the output beam 5 produced by the device will have the same colour as the light generated by the source 1, in this example white light.

When the control lever 10 is displaced from its neutral rest position in a selected direction the filter plate 3 is displaced in a corresponding direction, by an amount proportional to the displacement of the lever 10, so that the light incident on the filter plate 3 from the input light guide 2 passes in part through one or more of the coloured peripheral areas 7 of the filter plate 3, and in part through the clear central area 6. The relative proportion of the coloured area to the clear central area intercepted by the light beam will be dependent upon the displacement of the filter plate 3 and, therefore, upon the displacement of the control lever 10. Mixing of two colours is effected by displacing the filter plate 3 so that the input light beam passes through portions of ajoining differently coloured filter areas 7. After passing through the filter plate 3 the light beam will have components of different colour, which components are mixed in the integrating light guide 4 to produce an output beam 5 of uniform colour.

With the arrangement illustrated the hue of the output light beam is determined by the arrangement of the differently coloured peripheral areas 7 of the filter plate 3, and by the direction of displacement of the control lever 10, while the depth of the colour is determined by the amount of the displacement of the lever 10 from its neutral position.

To ensure a random distribution of the directions of the rays making up the output light beam 5 the output end of the integrating light guide 4 is preferably greyed, that is to say, the individual optical fibres of the light guide 4 terminate in different random planes. When, therefore, the output light beam 5 is used to illuminate a surface such as a screen an illuminated area of uniform colour and intensity is produced, which is suitable for colour comparison purposes.

A number of beam producing devices such as that illustrated diagrammatically in FIG. 1 may be arranged in a multiple beam projector, with the control levers 10 of the individual devices arranged in a common console so that the hue and depth of each coloured output beam 5 can be individually controlled, as previously described.

The device according to the invention is preferably adapted for the easy interchange of filter plate 3 having different arrangements and colour combinations of the coloured areas 7. Moreover, it will be appreciated that different optical arrangements may be used for directing a light beam through the filter plate 3, and for integrating the light beam after it has passed through the filter plate 3 to mix the colour components of the beam.

I claim:

1. A device for producing a light beam of variable color, comprising, in combination: a light source;

fibre optic light guide means arranged with an input end adjacent said source;

a composite filter having a central clear area and a number of peripheral areas of different color adjacent said central area, said filter being arranged adjacent the light output end of said light guide means and the central area of the filter having a cross section substantially equal to that of the beam provided by the light guide means;

control means for selectively displacing the filter in a plane normal to said beam to cause the beam to pass through selectively variable proportions of the central area and selected said peripheral areas of the filter, to vary selectively the color composition of the beam transmitted by the filter, and a fibre optic integrating light guide for integrating the light beam after its passage through the filter, said integrating light guide comprising light-conducting fibres the relative positions of which are interchanged randomly between the input and output ends of said guide.

2. The device defined in claim 1, wherein the filter comprises a square plate subdivided into areas of different colour with linear boundaries between said areas extending substantially radially from the central area.

3. The device defined in claim 1, wherein the control means are effective to displace the filter selectively in different directions under manual control.

4. The device defined in claim 3, wherein the control means include a servo-mechanism operatively connected to the filter and a universally movable manual control member associated with the servo-mechanism, movement of the control member from a neutral position in any selected direction causing displacement in a corresponding direction of the filter relative to the light beam, by an amount proportional to the displacement of the control member from its neutral position.

* * * * *